June 6, 1944. R. A. DICK 2,350,498
FASTENING DEVICE
Filed July 20, 1942

INVENTOR
RALPH A. DICK
BY
ATTORNEY

Patented June 6, 1944

2,350,498

UNITED STATES PATENT OFFICE 2,350,498

FASTENING DEVICE

Ralph A. Dick, Williamsville, N. Y., assignor to Curtiss-Wright Corporation, a corporation of Delaware Application July 20, 1942, Serial No. 451,652

11 Claims. (Cl. 24—221)

This invention relates to fastening devices and is particularly suited for use in removably securing inspection plates or other removable portions of metal airplane structures which are required to take structural loads while in place and still be quickly and easily removable.

In such fastening devices, it is essential that the elements of the device be incapable of dropping out of place from the plates to be secured together. It is also essential that the fastening device permit of quick detachment of the plates, without access to the remote side of the device, by means of a simple tool, for example, a screw driver. In many of such fastening devices of the prior art, the actual tightening force is provided by a spring or other resilient means thereby leaving some flexibility between the parts. It is an object of this invention to provide a fastening device in which there is a positive gripping action. In addition, it is an object of this invention to provide a fastening device in which the locking force is adjustable, i. e., the parts may be tightened together to any desired degree.

Other objects of the invention will be obvious from or will be pointed out in the following description with reference to the drawing, in which.

Figure 1:
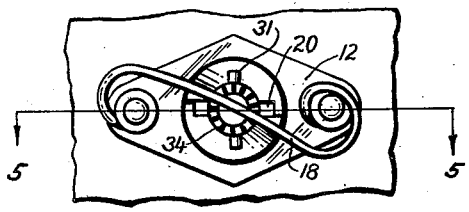
Fig. 1 is a plan view of the inner side of the fastening of the device.
Figure 2:
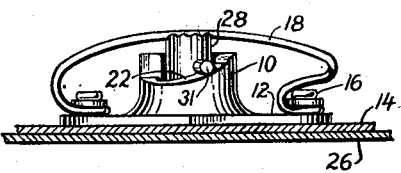
Fig. 2 is a section through the plates secured together showing a side elevation of the fastening device.

Referring to the drawing, a socket or collar element 10, having flanged portions 12, is secured to a plate 14 about an opening 15 therein by rivets 16 or other suitable securing means or is formed integral therewith. A locking spring 18 is secured to the collar flange portion 12, for example, by the rivets 16 which also secure the collar to the plate or in any other suitable manner. This locking wire spring 18 extends across the top of the collar 10, as best seen in Fig. 1. The collar 10 is provided with diametrically opposed grooves or guideways 20 and the inner edge of the collar 10 has formed thereon two similar spiral-like cam surfaces 22, each extending from one of the axial grooves 20 and in the same direction around the collar. An axial stop or projection 24 is provided at the ends of each of the cam surfaces 22.

The other plate 26 which is to be secured to plate 14, is provided with a stud 28. This plate is beveled as at 29 to receive the conventional screw head 30 of the stud. The opening 15 in plate 14 is similarly beveled. The stud 28 is provided with oppositely extending radial projections 31 adjacent its inner end. These projections 31 are adapted to be slidably received within the guideways 20. As shown, the projections comprise a rod-like member 32 extending through the stud 28. One of the functions of these projections is to prevent the stud 28 from falling out of the plate. The inner end of the stud 28 has a shallow cylindrical recess leaving a cylindrical flange portion 33. This flange portion is formed with axial teeth-like projections or serrations 34. These serrations are of such size as to be engageable by the spring 18 so that the spring is adapted for locking the stud 28 in various rotative positions.

Figure 3:
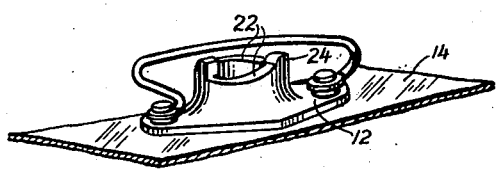
Fig. 3 is a perspective view of the collar portion of the device.
Figure 4:
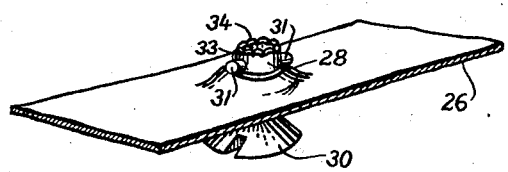
Fig. 4 is a perspective view of the stud portion of the device.
Figure 5:
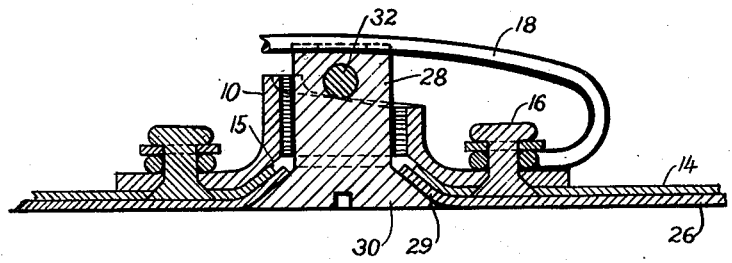
Fig. 5 is a section on the line 5—5 of Fig. 1.
Figure 6:
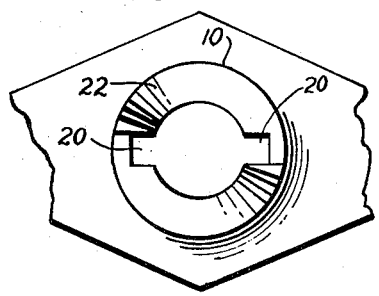
Fig. 6 is an enlarged view of the inner end of the collar.

The operation of the device is quite obvious from the above description. The plates 14 and 26 are placed relative to each other, as shown in Figs. 3 and 4, and the projections 31 on the stud 28 are slidably inserted in the grooves or guideways 20. As the projections 31 emerge from the inner end of the guideways 20, serrations 34 on the stud are engaged by the spring 18. The stud 28 may then be rotated by a screw driver or the like so that the projections 31 ride up on the cam surfaces 22. The inter-engagement between the spring 18 and serrations 34 serves to lock or hold the stud 28 in a desirable rotative position. Obviously, the extent of the clamping action between the plates is determined by the degree of relative rotation of the stud within the collar.

It is to be noted that there is no flexibility between the surfaces or plates when locked together. The spring 18 merely serves to lock the stud in a particular rotative position just as in a threaded fastening means friction locks the threads in a desirable rotative position. The engagement of the projections and cam surfaces provides a positive gripping action similar to the gripping action in a threaded fastening means. Furthermore, in this device, the plates may be quickly separated merely by giving the stud less than half a turn to aline the projections 31 with the grooves 20. Also, after the plates have been separated, there is no danger of losing any of the parts since they are all secured to the respective plates.

Figure 7:
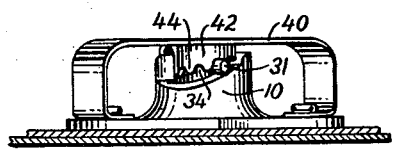
Fig. 7 is a perspective view of a modification.

Fig. 7 discloses a modification of the device in which a flat spring element 40 having a depending sleeve 42 is substituted for the round wire spring of Figs. 1 to 5. Otherwise, this modification is similar to Figs. 1 to 5. The depending sleeve is formed with serrations or tooth-like projections 44 adapted to mate with the serrations 34 formed on the end of the stud 28 thereby providing a holding action therebetween similar to that of Figs. 1 to 5.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A quickly detachable and adjustable fastening means for two plate-like members comprising a collar fixed to one of said members about an opening therein and having oppositely located spiral-like cam surfaces formed at its free end, a stud extending through the other member having an enlarged head at one end and opposed radial projections adjacent the other end, said stud in its operative position extending through both members and collar, the projections on the stud cooperating with the collar cam surfaces upon relative rotative movement of said stud and collar for drawing the stud into the collar to thereby draw the plate members together, axially extending serrations arranged about the axis of the stud at its inner end, resilient means on said collar engageable with said serrations to releasably hold said stud and collar in a plurality of relative rotative positions, and opposed axial grooves in said collar for receiving said projections, the inner ends of said grooves terminating adjacent the beginning of said spiral-like cam surfaces whereby said stud and its associated member may be quickly detached upon alinement of said projections and grooves.

2. A quickly detachable and adjustable fastening means for two members comprising a stud extending through one of said members having an enlarged head at one end and opposed radial projections adjacent the other end, a collar on the other of said members about an opening therein, said collar having oppositely located spiral-like cam surfaces for cooperation with said projections to produce axial movement of said stud into said collar upon rotation of said stud relative to said collar, whereby said members may be drawn together, resilient means secured relative to said collar, serrations on said stud engageable by said resilient means to releasably lock said stud and collar in any one of a plurality of relative rotative positions, and opposed axial grooves in said collar terminating adjacent the outer end of said spiral-like cam surfaces, whereby said stud and its associated plate-like member may be quickly detached upon alinement of said projections with said grooves.

3. A quickly detachable and adjustable fastening means for two plate-like members comprising a collar fixedly secured to one of said members and having a spiral-like cam surface, a stud rotatably secured to the other member and in its operative position extending into said collar, a radial projection on said stud for cooperation with said cam surface whereby upon relative rotation of said stud and collar said plate-like members may be drawn together, resilient means secured to said collar and extending diametrically across the inner end of said stud, axially extending serrations arranged about the axis of the stud at its inner end for engagement by said resilient means to releasably lock said collar and stud in any one of a plurality of relative rotative positions, and a groove in the inner surface of said collar and extending between the outer end of the collar and its spiral-like cam surface, whereby said stud and its associated member may be detached from said collar upon alinement of said projection with said groove.

4. A quickly detachable and adjustable fastening means for two plate-like members comprising a collar fixedly secured to one of said members about an opening therein and having oppositely located cam surfaces formed at its free end, a stud rotatably secured to the other member and in its operative position extending through said first mentioned member and into said collar, opposed radial projections on said stud for cooperation with said sam surfaces, whereby upon relative rotation of said stud and collar said plate-like members may be drawn together, resilient means secured to said collar and extending diametrically across the inner end of said collar, axially extending serrations arranged about the axis of the stud at its inner end for engagement by said resilient means to releasably lock said collar and stud in any one of a plurality of relative rotative positions, and opposed axial grooves in said collar and extending between the ends thereof, whereby said stud and its associated plate-like member may be quickly detached upon alinement of said projections and grooves.

5. A quickly detachable fastening means for two members comprising a stud means rotatably carried by one of said members, a collar means on the other of said members about an opening therein, said stud means being insertable into said collar means, interengaging formations on said stud and collar means so formed that rotational movement of the stud means relative to the collar means causes axial movement therebetween, whereby said members may be drawn together, a resilient element on one of said means, serrations on the other of said means engageable by said resilient element to releasably lock said means in any one of a plurality of relative rotative positions, and a groove formation on one of said means which upon alinement with the interengaging formation on the other of said means permits said stud means to be inserted in or detached from said collar means.

6. In a quickly adjustable fastening means for two members, stud means extending through one of said members having an enlarged head at one end and opposed radial projections adjacent the other end, collar means on the other of said members about an opening therein, said collar means having oppositely located cam surfaces for cooperation with said projections to produce axial movement of said stud means within said collar means as said stud means is rotated relative to said collar means, whereby said members may be drawn together, a resilient element fixedly secured to one of said means, serrations on the other of said means engageable by said element to releasably hold said means in any one of a plurality of relative rotative positions, and opposed axial grooves in said collar means for cooperation with said stud projections and extending from the member end of said collar means to said cam surfaces, whereby said stud means may be removed or inserted into said collar means upon alinement of said projections and grooves.

7. In a quickly adjustable fastening means for two members, stud means extending through one of said members having an enlarged head at one end and opposed radial projections adjacent the other end, collar means on the other of said members disposed about an opening therein, said collar means having oppositely located cam surfaces for cooperation with said projections to produce axial movement of said stud means within said collar means upon relative rotation of said stud and collar means whereby said members may be drawn together, a resilient element fixedly secured to one of said means, and serrations on the other of said means engageable by said element to releasably hold said means in any one of a plurality of relative rotative positions.

8. A quickly detachable and adjustable fastening means for two plate-like members comprising a collar fixed to one of said members about an opening therein and having oppositely located spiral-like cam surfaces formed at its free end, each spiral-like cam surface extending less than 180 degrees around the collar and in the same rotative direction, opposed axial grooves in said collar terminating adjacent the beginning of said spiral-like cam surfaces, a stud extending through the other member having an enlarged head at one end and opposed radial projections adjacent the other end, said stud projections being insertable through said collar upon alinement of said projections and grooves and thereafter the stud may be rotated therein to cause the projections to cooperate with the cam surfaces to tightly draw the members together, serrations on the inner portion of the stud, and resilient means on the collar engageable with the serrations to hold said stud and collar in any one of a plurality of relative rotative positions.

9. A quickly detachable and adjustable fastening means for two plate-like members comprising a collar fixed to one of said members about an opening therein and having oppositely located spiral-like cam surfaces formed at its inner end, opposed axial grooves in said collar terminating adjacent the beginning of said cam surfaces, a stud extending through the other member having an enlarged head at one end and opposed radial projections adjacent the other end, said stud projections being insertable through said collar upon alinement of said projections and grooves and thereafter the stud may be rotated therein to cause the projections to cooperate with the cam surfaces to tightly draw the members together, axial extending serrations arranged about the stud axis at its inner end, and a resilient wire-like member secured relative to said collar and extending diametrically across the inner end of the collar and engageable with said serrations to releasably lock said collar and stud in any one of a plurality of relative rotative positions.

10. A quickly separable and adjustable fastening device comprising a collar having oppositely located spiral-like cam surfaces formed at its inner end, opposed axial grooves extending between the ends of the collar, a stud having a head at one end and opposed radial projections adjacent the other end, said stud projections being insertable through the collar upon alinement with the collar grooves and thereafter the stud may be rotated therein to cause engagement of the projections with the cam surfaces to thereby draw the stud head toward the collar, resilient means on said collar, serrations on said stud engageable by said resilient means to releasably lock said stud and collar in any one of a plurality of relative rotative positions.

11. A quickly separable and adjustable fastening device comprising a collar element having oppositely located spiral-like cam surfaces, opposed axial grooves extending between the ends of the collar, a stud element having opposed radial projections insertable through the collar element upon alinement of said projections and grooves and thereafter the stud may be rotated relative to the collar element to cause engagement of said projections with said cam surfaces, resilient means on one of said elements, and serrations on the other element and engageable by said resilient means to releasably lock said stud and collar elements in any one of a plurality of relative rotative positions.

RALPH A. DICK.